United States Patent [19]

Blasing, Jr.

[11] 3,859,243

[45] Jan. 7, 1975

[54] MELAMINE-FORMALDEHYDE RESIN CONTAINING 2-(2-AMINOETHOXY) ETHANOL

[75] Inventor: Elmer Paul Blasing, Jr., Cincinnati, Ohio

[73] Assignee: Formica Corporation, Cincinnati, Ohio

[22] Filed: Nov. 27, 1973

[21] Appl. No.: 419,325

[52] U.S. Cl.... 260/32.6 N, 260/33.2 R, 260/67.6 R, 161/215, 161/259, 161/263
[51] Int. Cl......... C08g 9/30, C08g 9/32, C08k 1/44
[58] Field of Search................... 260/67.6 R, 32.6 N

[56] References Cited
UNITED STATES PATENTS

| | | | |
|---|---|---|---|
| 2,466,744 | 4/1949 | Scott | 260/67.6 |
| 2,467,160 | 4/1949 | Scott | 260/67.6 |
| 2,750,355 | 6/1956 | Ledden | 260/67.6 |
| 2,795,513 | 6/1957 | Rossin | 260/67.6 X |
| 3,033,823 | 5/1962 | Malashevitz et al. | 260/67.6 X |
| 3,513,126 | 5/1970 | Ehlers et al. | 260/32.6 N X |

*Primary Examiner*—Howard E. Schain
*Attorney, Agent, or Firm*—Frank M. Van Riet

[57] ABSTRACT

2-(2-Aminoethoxy) ethanol is used as an internally reactive plasticizer in melamine/formaldehyde resins.

4 Claims, No Drawings

MELAMINE-FORMALDEHYDE RESIN CONTAINING 2-(2-AMINOETHOXY) ETHANOL

BACKGROUND OF THE INVENTION

In the general manufacture of these resins, melamine and formaldehyde are reacted under known conditions via a condensation reaction. The resinous compositions produced are heat curable, or potentially heat curable, and may be formed into molded articles, surfaces, laminates, panels and the like. The condensation products are water-soluble, or at least water-dispersible, and solutions or syrups thereof may, hence, be obtained. These resins, however, exhibit erratic flow during pressing and molding under elevated temperatures and thereby result in articles which are less than satisfactory in their overall properties.

It has been known that the flow control deficiencies in the resin compositions may be obviated by the incorporation therein of various plasticizers or other modifiers. The addition of other materials to improve dimensional stability, workability, etc. has also been practiced. While certain of the physical properties of the melamine/formaldehyde resins have been improved by the incorporation of various modifiers therein, certain undesired features nevertheless still exist when the compositions are employed, as for example, in the production of laminates. Thus, when a melamine/formaldehyde-plasticizer modified resin impregnated overlay or print sheet is used in combination with a core assembly impregnated with a different thermosetting resinous composition, e.g., a phenol-formaldehyde resin, there is a tendency of the resin material of the core to migrate into the print sheet thereby producing a discoloration of the finished laminate. This phenomena is known as bleeding, and it is generally mitigated by using an increased, i.e., upwards of 5 percent more than really needed, amount of melamine/formaldehyde resin in the print sheet or overlay. Obviously, such an increase in resin consumption is uneconomical and may even detract from other otherwise acceptable properties of the laminate.

Additionally, other modifiers that have been employed in the prior art, while imparting enhanced properties to the cured material, cause undesired characteristics during the laminate preparation. For example, some modifiers, when incorporated into the resinous syrup, produce an unstable composition. In some instances, the resinous composition, after impregnation of the webs and during drying thereof, has a tendency to froth and the only technique known to inhibit the frothing is to dry very slowly, which of course is uneconomical.

One of the most commonly used plasticizers is o,p-toluene sulfonamide (OPTS), while the methylol anilomethanes (U.S. Pat. No. 2,033,823), glycerine, diethylene glycol and reaction products thereof with epichlorohydrins (U.S. Pat. No. 2,678,308) have also been used. Although OPTS and the methylol aminomethanes, as internal plasticizers, do enhance the properties of most products prepared from melamine/formaldehyde resin, they also present problems or limitations in their use. OPTS must be used in quantities of at least 7-9 percent, by weight based on the weight of the melamine and also requires heat to put it into solution when it is added to previously prepared resins, e.g., spray dried resin. The methylol aminomethanes exhibit water sensitivity in the final product when used in large quantities.

The glycerine and glycol additives are external plasticizers and their use is very limited because their strong flow promoting characteristics cause migration of the melamine/formaldehyde resin into the core sheets during laminate production. Furthermore, resins modified with the glycols show water-sensitivity in the same manner as the aminomethanes, mentioned above, i.e., humidity causes increased flowability of resins modified in this manner. Furthermore, the plasticizer also leaches out of the laminate product into which is has been incorporated when the laminate comes in contact with water in normal use.

SUMMARY

I have now found a new plasticizer which may be incorporated into melamine/formaldehyde resins such that the resin compositions and the ultimate products produced therefrom do not possess any of the disadvantages mentioned above with regard to the use of other plasticizers and still exhibit excellent properties with regard to flow during pressing, dimensional stability, workability, non-bleeding, non-frothing water-sensitivity, etc. The new plasticizer, 2-(2-aminoethoxy) ethanol, can be used in very low quantities, does not require heat in order to incorporate it into a preformed melamine/formaldehyde resin and does not promote flow of the resin from the sheets with which the resin containing it is impregnated into adjoining sheets in the production of laminates. The laminate exhibit excellent color, hardness and solvent and chemical resistance, the resin compositions having resulted in a thorough web impregnation and thereby excellent bonding.

DESCRIPTION OF THE INVENTION INCLUDING PREFERRED EMBODIMENTS AND BEST MODE OF OPERATION

As mentioned above, my invention resides in the incorporation of 2-(2- aminoethoxy) ethanol into melamine/formaldehyde resins in order to impart plasticizing effects thereto thereby enhancing the existing properties thereof without causing undesirable side-effects.

The melamine/formaldehyde resins to which the 2-(2- aminoethoxy) ethanol is added to form the novel reaction products of the instant invention are well known in the art and are prepared by the condensation reaction of melamine with formaldehyde, see U.S. Pat. No. 3,033,823. The mole ratio of formaldehyde to melamine used is generally at least one mole of formaldehyde per mole of melamine, however a range from about 1:1 to about 6:1, respectively, is generally applicable with a range of from about 1.5:1 to about 4:1, respectively, being preferred.

The 2-(2- aminoethoxy) ethanol has the general formula

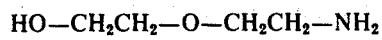

and is a well known material. It, a method for its preparation and another use therfor are set forth in U.S. Pat. No. 2,712,978, hereby incorporated herein by reference.

The 2-(2- aminoethoxy) ethanol may be incorporated into the melamine/formaldehyde resin during the formation of the resin or after the resin has been formed in amounts ranging from about 0.005 to 0.5 mole per mole of melamine used, with an amount ranging from about 0.05 to about 0.1 mole per mole of melamine, being preferred.

Since the 2-(2- aminoethoxy) ethanol is a liquid, it can be added, as such, to the melamine-formaldehyde charge materials during the resin formation or any time during the resin formation. It is preferred to monitor the water dilutability of the resin during its formation in a known manner and add the ethanol plasticizer when the dilutability reaches about 350 percent. When the 2-(2- aminoethoxy) ethanol is added after the melamine/formaldehyde resin formation, it may be added thereto as a liquid or as a solution in water. Also, if the melamine/formaldehyde resin is in solid or powdered form, the resin need only be reconstituted in e.g., water, and the ethanol plasticizer added thereto.

Resins prepared in accordance with my invention, as indicated above, may be used in the preparation of melamine decorative surface high pressure laminates of both the general purpose type and postforming type as well as vertical surfacing laminates. They are also useful in the preparation of hardboard or flakeboard core laminates and low pressure melamine panels.

The following examples are set forth for pusposes of illustration only and are not to be construed as limitations on the present invention except as set forth in the appended claims. All parts and percentages are by weight unless otherwise specified.

Example 1

To a stainless steel reaction vessel are charged 1.8 moles of an aqueous 37 percent formaldehyde solution for each mole of melamine also charged. The pH of the resultant slurry is adjusted to a pH of 9.6–9.8 with diethyl ethanol amine. The reaction mixture is heated to 90°C. and held at that temperature. During the reaction, the water dilutability of the mixture is monitored. When a dilutability of 350 percent, measured at 25°C., is reached, 0.06 mole of 2-(2- aminoethoxy) ethanol is added per mole of melamine previously charged. The reaction media is allowed to cool to room temperature. The resultant water-white, modified melamine/formaldehyde resin has a water dilutability of 140 percent and a shelf life of 21 days.

Example 2

A melamine/formaldehyde resin is prepared in accordance with the procedure of Example 1 except that the 2-(2- aminoethoxy) ethanol is charged to the reactor with the formaldehyde solution and melamine crystals. The resultant mixture is heated to 90°C., reacted to a dilutability of 350 percent and cooled to room temperature. A similar resinous product is recovered.

Example 3

The procedure of Example 1 is again followed except when the dilutability of the resultant melamine/formaldehyde resin reaches 350 percent, the reaction media is cooled to room temperature. The 2-(2- aminoethoxy) ethanol is then added with agitation. A product having properties substantially identical to those of the product of Example 1 is recovered without further heating.

Example 4

A commercially available melamine/formaldehyde resin in powder form is reconstituted by dissolving it in water at a concentration of 42 percent. To the resultant solution is added 2-(2- aminoethoxy) ethanol at a mole ratio of 0.005 mole per mole of melamine therein. After 30 minutes, with moderate agitation, a resinous reaction product having a shelf-life of 19 days, a water-dilutability of 160 percent and a water-white appearance is recovered.

Example 5

A commercially available kraft paper is impregnated with a conventional phenol/formaldehyde corestock resin to a resin content of 29 percent and dried to a volatile content of 4.5 percent. A multi-color printed alpha-cellulose decorative paper of 90 pound basis weight is impregnated with the resinous product produced in Example 1 to a resin content of 39 percent and dried to a volatile content of 5 percent. Similarly, an alpha-cellulose overlay sheet of 28 pound basis weight is impregnated with the melamine resin of Example 1 to a resin content of 68 percent and dreid to a volatile content of 4.5 percent. No frothing occurs during any drying step. The dry sheets show no increased sensitivity to water or humidity. An assembly is prepared consisting of seven sheets of the so-prepared phenolic resin impregnated kraft paper surfaced with a single sheet of the so-prepared melamine impregnated decorative paper overlayed with a single sheet of the so-prepared overlay paper. The entire assembly is pressed against polished steel plates for 15 minutes at 140°C. at 1,400 pse, cooled and removed from the press. The fully cured laminate reveals the decorative sheet clearly through the transparentized overlay sheet and it possesses a hard, glossy, wear-resistant surface which is impervious to most chemical agents. No bleeding through of the phenolic resin can be detected. Small samples are cut from the laminate and subjected to testing as described in NEMA Standard No. LD 1-1971. The samples passed all tests satisfactorily.

Examples 6–8

Following the procedure of Example 5 but using the melamine resins of Examples 2–4 instead of that of Example 1, a series of three laminates, all having a melamine surface exhibiting excellent properties, is produced.

Example 9 (Comparative)

When the procedure of Example 5 is repeated except that the 2-(2- aminoethoxy) ethanol component is omitted from the melamine/formaldehyde resin, the resin is difficult to process and exhibits poor flow characteristics. The finished laminate is seriously crazed and is not formable.

Example 10

A commercially available crepe paper is impregnated with a postformable phenolic resin to a resin content of 35 percent and dried to a volatile content of 3 percent. An assembly is prepared using two sheets of the phenolic impregnated crepe, three sheets of the phenolic impregnated kraft paper of Example 5 and surfaced with the decorative paper and overlay sheet described in Example 5. The assembly is pressed against polished steel plates for 15 minutes at 135°C. and 1,400 psi, cooled and removed from the press. The resultant laminated possesses a hard, glossy, wear-resistant surface which is impervious to most chemicals. The laminate possesses all the NEMA tests set out in Example 5 and exhibits no bleeding of the phenolic resin into the decor and overlay sheets.

Example 11

A decorative sheet as described in Example 5 is so impregnated with the melamine/formaldehyde reaction product of of Example 2 to 65 percent volatiles. The dried sheet is placed atop a flakeboard core of one inch in thickness and pressed at 150°C. and 325 psi. The resultant pressed panel passes all recognized tests for low pressure melamine panels.

I Claim:

1. The resinous reaction product of (1) at least one mole of formaldehyde per mole of (2) melamine and (3) from about 0.005 to about 0.5 mole of 2-(2-aminoethoxy) ethanol per mole of melamine.

2. The reaction product of claim 1 wherein the mole ratio of formaldehyde to melamine ranges from about 1:1 to about 6:1, respectively.

3. The reaction product of claim 1 wherein the mole ratio of formaldehyde to melamine ranges from about 1.5:1 to about 4:1, respectively.

4. The reaction product of claim 1 containing from about 0.05 to about 0.1 mole of 2-(2-aminoethoxy) ethanol per mole of melamine.

* * * * *

UNITED STATES PATENT OFFICE
CERTIFICATE OF CORRECTION

Patent No. 3,859,243　　　　　　　　　Dated January 7, 1975

Inventor(s) ELMER PAUL BLASING, Jr.

It is certified that error appears in the above-identified patent and that said Letters Patent are hereby corrected as shown below:

Column 1 line 55.　Change "ani-" to read -- ami- --.
Column 2 line 12.　Change "is" to read -- it --.
Column 3 line  1.　After "0.005 to" insert -- about --.
Column 4 line 31.　Change "pse" to read -- psi --.
Column 5 line  1.　Change "nated" to read -- nate --;
Column 5 line 10.　After "65 percent" add -- resin and dried to 6.5% --.
Column 6, in Claims 2, 3 & 4.　Change "claim 1" to -- Claim 1 --.

Signed and sealed this 27th day of May 1975.

(SEAL)
Attest:

RUTH C. MASON
Attesting Officer

C. MARSHALL DANN
Commissioner of Patents
and Trademarks